United States Patent
Bellamah et al.

(10) Patent No.: US 10,766,679 B2
(45) Date of Patent: Sep. 8, 2020

(54) THERMOFORMABLE MULTILAYER FILMS AND BLISTER PACKS PRODUCED THEREFROM

(71) Applicant: PHILIP MORRIS USA INC., Richmond, VA (US)

(72) Inventors: Stephen J. Bellamah, Midlothian, VA (US); Ed Carmines, Midlothian, VA (US); Rangaraj S. Sundar, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 412 days.

(21) Appl. No.: 14/745,090

(22) Filed: Jun. 19, 2015

(65) Prior Publication Data
US 2015/0284162 A1    Oct. 8, 2015

Related U.S. Application Data

(62) Division of application No. 12/551,919, filed on Sep. 1, 2009, now Pat. No. 9,511,914.

(51) Int. Cl.
*B32B 27/08* (2006.01)
*B65D 65/40* (2006.01)
(Continued)

(52) U.S. Cl.
CPC .............. *B65D 65/40* (2013.01); *B05D 7/56* (2013.01); *B29C 48/21* (2019.02); *B32B 3/28* (2013.01);
(Continued)

(58) Field of Classification Search
CPC .. B32B 7/02; B32B 27/08; B32B 7/06; B32B 15/08; Y10T 428/1334; Y10T 428/1359; Y10T 428/1345; Y10T 428/1352
(Continued)

(56) References Cited

U.S. PATENT DOCUMENTS

| | | | |
|---|---|---|---|
| 3,479,425 | A | 11/1969 | Lefevre et al. |
| 3,480,580 | A | 11/1969 | Joyner et al. |

(Continued)

FOREIGN PATENT DOCUMENTS

| | | | |
|---|---|---|---|
| EP | 0510188 A2 | 10/1992 | |
| EP | 0570188 A2 | 11/1993 | |

(Continued)

OTHER PUBLICATIONS

Written Opinion of the International Search Authority of International Application No. PCT/IB2010/002480 dated Feb. 2, 2011.
(Continued)

*Primary Examiner* — Ellen S Hock
(74) *Attorney, Agent, or Firm* — Harness, Dickey & Pierce, P.L.C.

(57) ABSTRACT

A multi-layer film structure for use in forming blister packaging. The multi-layer structure includes a first polymeric layer having a first surface and a second surface, the first polymeric layer comprising a metalized polyethylene teraphthalate, a second polymeric layer having a first surface and a second surface, the first surface of the second polymeric layer disposed adjacent the second surface of the first polymeric layer, the second polymeric layer comprising a cyclic olefin or a homopolymer of chlorotrifluoroethylene, and a third polymeric layer having a first surface and a second surface, the first surface of the third polymeric layer disposed adjacent the second surface of the second polymeric layer, the third polymeric layer comprising polypropylene or polyvinyl chloride. A method of making a multi-layer film structure and a packaging structure are also provided.

21 Claims, 2 Drawing Sheets

(51) Int. Cl.
| | |
|---|---|
| *B29C 48/21* | (2019.01) |
| *B32B 15/08* | (2006.01) |
| *B32B 27/32* | (2006.01) |
| *B65D 75/32* | (2006.01) |
| *B32B 27/40* | (2006.01) |
| *B32B 27/30* | (2006.01) |
| *B32B 7/12* | (2006.01) |
| *B32B 27/36* | (2006.01) |
| *B32B 27/10* | (2006.01) |
| *B32B 15/20* | (2006.01) |
| *B32B 3/28* | (2006.01) |
| *B32B 7/05* | (2019.01) |
| *B32B 27/34* | (2006.01) |
| *B05D 7/00* | (2006.01) |
| *C23C 18/16* | (2006.01) |
| *C25D 7/06* | (2006.01) |
| *B29K 23/00* | (2006.01) |
| *B29K 27/06* | (2006.01) |
| *B29K 67/00* | (2006.01) |
| *B29L 31/00* | (2006.01) |

(52) U.S. Cl.
CPC ............... *B32B 7/05* (2019.01); *B32B 7/12* (2013.01); *B32B 15/08* (2013.01); *B32B 15/20* (2013.01); *B32B 27/08* (2013.01); *B32B 27/10* (2013.01); *B32B 27/302* (2013.01); *B32B 27/304* (2013.01); *B32B 27/32* (2013.01); *B32B 27/322* (2013.01); *B32B 27/325* (2013.01); *B32B 27/34* (2013.01); *B32B 27/36* (2013.01); *B32B 27/40* (2013.01); *B65D 75/327* (2013.01); *C23C 18/1633* (2013.01); *C25D 7/0614* (2013.01); *B29K 2023/12* (2013.01); *B29K 2023/38* (2013.01); *B29K 2027/06* (2013.01); *B29K 2067/003* (2013.01); *B29L 2031/7164* (2013.01); *B32B 2255/10* (2013.01); *B32B 2255/205* (2013.01); *B32B 2270/00* (2013.01); *B32B 2307/306* (2013.01); *B32B 2307/518* (2013.01); *B32B 2307/714* (2013.01); *B32B 2307/72* (2013.01); *B32B 2307/7246* (2013.01); *B32B 2307/75* (2013.01); *B32B 2435/02* (2013.01); *B32B 2439/80* (2013.01); *Y10T 156/10* (2015.01); *Y10T 428/263* (2015.01); *Y10T 428/264* (2015.01); *Y10T 428/265* (2015.01); *Y10T 428/3154* (2015.04)

(58) Field of Classification Search
USPC ................... 428/35.7, 34.1, 36.91
See application file for complete search history.

(56) References Cited

U.S. PATENT DOCUMENTS

| | | |
|---|---|---|
| 3,481,910 A | 12/1969 | Brunson et al. |
| 3,959,431 A | 5/1976 | Nissel |
| 4,406,547 A | 9/1983 | Aihara |
| 4,421,721 A | 12/1983 | Byer et al. |
| 4,612,155 A | 9/1986 | Wong et al. |
| 4,751,270 A | 6/1988 | Urawa et al. |
| 4,994,229 A | 2/1991 | Flecknoe-Brown |
| 5,106,567 A | 4/1992 | Demerest |
| 5,139,878 A | 8/1992 | Kim et al. |
| 5,695,541 A | 12/1997 | Kosanke et al. |
| 5,750,262 A | 5/1998 | Gasse et al. |
| 5,755,081 A | 5/1998 | Rivett et al. |
| 5,783,270 A | 7/1998 | Fischer et al. |
| 5,912,070 A | 6/1999 | Miharu et al. |
| 6,008,298 A | 12/1999 | Hatke et al. |
| 6,042,906 A | 3/2000 | Itoh et al. |
| 6,068,936 A | 5/2000 | Peiffer et al. |
| 6,086,600 A | 7/2000 | Kortenbach |
| 6,383,582 B1 | 5/2002 | Salste et al. |
| 6,489,016 B2 | 12/2002 | Kishine |
| 6,608,936 B2 | 8/2003 | Boon |
| 2003/0203141 A1 | 10/2003 | Blum et al. |
| 2004/0131868 A1 | 7/2004 | Watanabe et al. |
| 2005/0233240 A1 | 10/2005 | Rosenberger et al. |
| 2006/0231447 A1* | 10/2006 | Fensham ............... B65D 75/36 206/471 |
| 2007/0160789 A1 | 7/2007 | Merical et al. |
| 2009/0294319 A1 | 12/2009 | Nigeli et al. |
| 2011/0011756 A1* | 1/2011 | Bellamah ............... B65D 5/38 206/223 |

FOREIGN PATENT DOCUMENTS

| | | |
|---|---|---|
| EP | 0920989 A2 | 6/1999 |
| JP | H04276253 | 10/1992 |
| JP | H0680792 | 3/1994 |
| JP | H11165387 | 12/1997 |
| JP | 2001199000 A | 7/2001 |
| JP | 2005104140 | 4/2005 |
| JP | 2005523188 A | 8/2005 |
| JP | 2007021756 | 2/2007 |
| JP | 2009511298 | 3/2009 |
| JP | 2009511310 | 3/2009 |
| JP | 2009082287 | 4/2009 |
| RU | 2039663 C1 | 7/1995 |
| RU | 2007147945 A | 7/2009 |

OTHER PUBLICATIONS

International Search Report for International Application No. PCT/IB2010/002480 dated Feb. 2, 2011.

* cited by examiner

THERMOFORMABLE MULTILAYER FILMS AND BLISTER PACKS PRODUCED THEREFROM

This application is a divisional of co-pending U.S. application Ser. No. 12/551,919, filed Sep. 1, 2009, the entire contents of which are hereby incorporated by reference.

FIELD

This document relates generally to multilayered films and more specifically to a multilayered film having a chrome or mirror-like appearance on at least one surface thereof. The films disclosed herein exhibit excellent moisture barrier properties, thermoform well and are suitable for producing blister packs for packaging a plurality of tablets, such as smokeless compressed tobacco products.

New forms of smokeless tobacco products have entered the market place recently, or have been described, including products in the form of gels, films and tablets. Designing packaging for use with a smokeless tobacco product in the form of a tablet provides unique challenges. For example, with tobacco-based products, moisture content can become an issue, since tobacco is, by its nature, hygroscopic. Child-resistance is also another desirable property for packaging used with a smokeless tobacco product.

In the packaging of tablets for distribution to consumers, blister packs are frequently utilized. In particular, when dispensing pharmaceutical or certain other consumer products, blister packaging is generally favored over loose or bottled tablets, for certainty in quantity dispensed, security of storage and convenience of use.

Blister packs are commonly formed by molding a thin sheet of synthetic plastic or laminated material into a multi-pocket or compartment tray-like structure. This may be undertaken continually on-line followed by a filling and closure operation.

The pockets or compartments are commonly disposed in a rectangular grid array. Typically, an individual compartment is intended to contain a single item. Compartment contents may be accessed at random, or, in certain instances, in a prescribed sequence. A peripheral upstanding rim, ledge or ridge may be incorporated, to help stiffen the overall tray profile and further protect the contents of the compartments.

Blister packs are typically formed by molding resiliently deformable synthetic plastics into a pre-configured array of multiple discrete pockets or blisters. A tablet is captured or restrained within the pockets by a releasable, removable or frangible backing layer, typically produced from a metal, such as aluminum foil, metalized plastics foil, or a laminated paper and foil combination. In a laminated paper and foil combination, the paper is adhesively bonded in a laminated, multi-ply, overlay to the foil, and used as a lift-off release layer. As such, the paper is intended to protect the underlying foil while the paper is in place. To that end, the paper is bonded to the foil, and is not otherwise secured to the blister pack itself.

A variety of films have been used to form blister packs. Conventional films for use for use in forming blister packs typically include polymers such as polyvinyl chloride (PVC), polyvinylidene chloride (PvDC), and/or fluoropolymers.

Typically, films that are used solely as dust barriers include a monolayer sheet including only PVC. These films typically do not include any additional polymer layers due to increased production costs that accompany the use of the additional polymers. These films also cannot be used as effective moisture barriers because PVC is known to permit high levels of moisture to penetrate the film. Therefore, PVC is unsuitable for use alone in applications which require moisture protection.

Attempts have been made to overcome issues of moisture protection in films. These attempts include the use of halogens and fluoropolymers in films that also include PVC and PvDC. The halogens and fluoropolymers typically include fluorine and polychlorotrifluoroethylene. Use of the halogens and fluoropolymers allow the films to provide adequate moisture protection and to be used as moisture barriers.

A film including fluoropolymers that is representative of a film that is an effective moisture barrier is proposed in U.S. Patent Application Publication No. 2003/0203141 to Blum et al. Blum et al. uses a film including a first adhesive layer including a styrene butadiene copolymer, a base, an outermost layer including cyclic olefin copolymers, and a fluoropolymer in an outer layer of the film. Blum et al. also uses acyclic olefin copolymers in the outer layer of the film. It is known that the cyclic olefin copolymers are subject to degradation if contacted with oils, organic and alkaline solvents, and heat. Because of this degradation, the outer layer of the film is subject to deterioration and poor performance.

Cyclo-olefin copolymers (COC) exhibit excellent transparency and moisture permeation properties, in addition to heat resistance, chemical resistance, solvent resistance, and rigidity. COP, a non-crystalline copolymer, has the further advantage of being amenable to thermoforming. While these properties make COC desirable in packaging applications, thermoformed COC is sometimes susceptible to stress cracking when exposed to alkaline environments. A multilayered film incorporating a COC layer is proposed in U.S. Pat. No. 6,042,906 to Itoh et al. which discloses a plastic container having a COC layer adhered to an olefin resin or an ethylene/vinyl copolymer layer. The COC layer is adhered to the non-cyclic olefin layers with an adhesive resin.

Multilayer polymer films or laminates, produced for their aggregate properties, often include "tie" layers of adhesive materials since different polymers usually do not readily adhere to one another.

Multilayered polymeric films or sheets may be produced by co-extrusion. U.S. Pat. Nos. 3,479,425; 3,959,431; and 4,406,547 describe co-extrusion processes. Multilayered films are usually co-extruded by passing two or more melt streams of polymers through a die. The materials are fused together into a layered structure and are allowed to cool. Once extruded, plastic films can be shaped into containers by subjecting them to a thermoforming process. The construction of blister packaging or other articles of manufacture by thermoforming processes is well known.

Thermoforming is credited with producing packaging having high durability and integrity. U.S. Pat. Nos. 4,421,721; 4,994,229; 5,106,567; and 6,086,600 describe various thermoforming processes for plastic containers. Generally, a thermoforming process forms plastic containers and packaging structures by heating a sheet of plastic to a desirable forming temperature and shaping the plastic by subjecting it to vacuum or pressure shaping in a mold.

Thermoformed blister packaging commonly contains commercial articles including food products, personal care products, and the like. U.S. Pat. No. 6,489,016 discloses multilayer packaging films of polyolefin. Also proposing such packaging materials and packages made therefrom are U.S. Pat. Nos. 6,383,582; 5,750,262; 5,783,270; and 5,755,081. The moisture barrier properties of a film are an important characteristic in packaging applications. Moisture transmission through a container may adversely affect the contents, especially in applications where the packaging contains pharmaceuticals, food products, compressed tobacco products and the like.

Despite advances in the art, there is still a need, particularly in blister packaging applications, for thermoformable sheets and films having suitable moisture barrier properties, a premium appearance and which are highly processable, for forming blister packs for use with a plurality of tablets, such as smokeless compressed tobacco products.

SUMMARY

Disclosed herein are multi-layer film structures for use in forming blister packs for packaging a plurality of tablets and for methods for making such structures and blister packs.

In one aspect, provided is a multi-layer film structure for use in forming blister packaging. The multi-layer structure includes a first polymeric layer having a first surface and a second surface, the first polymeric layer including a metalized polyethylene teraphthalate, a second polymeric layer having a first surface and a second surface, the first surface of the second polymeric layer disposed adjacent the second surface of the first polymeric layer, the second polymeric layer including a cyclic olefin or a homopolymer of chlorotrifluoroethylene, and a third polymeric layer having a first surface and a second surface, the first surface of the third polymeric layer disposed adjacent the second surface of the second polymeric layer, the third polymeric layer including polypropylene or polyvinyl chloride.

In one form, the multi-layer film structure further includes a first tie layer disposed between the second surface of the first polymeric layer and the first surface of the second polymeric layer.

In another form, the multi-layer film structure further includes a second tie layer disposed between the second surface of the second polymeric layer and the first surface of the third polymeric layer.

In yet another form, the first tie layer and the second tie layer each include an adhesive lacquer.

In another form, the multi-layer film structure is a laminated construction.

In another form, the multi-layer film structure has a density of from 0.98 to 1.03 g/cm$^3$.

In another form, the multi-layer film structure has a water vapor transmission rate of from 0.20 to 3.00 g/m$^2$/24 hrs, as determined by ASTM F-1249.

In another form, the first polymeric layer of the multi-layer film structure has a thickness of from about 25 μm to about 205 μm.

In another form, the second polymeric layer of the multi-layer film structure has a thickness of from about 75 μm to about 205 μm.

In another form, the third polymeric layer of the multi-layer film structure has a thickness of from about 25 μm to about 205 μm.

In another aspect, provided is a method of making a multi-layer film structure. The method includes the steps of forming a first polymeric layer having a first surface and a second surface, the first polymeric layer including a metalized polyethylene teraphthalate, forming a second polymeric layer having a first surface and a second surface, the first surface of the second polymeric layer positioned adjacent the second surface of the first polymeric layer, the second polymeric layer including a cyclic olefin, and forming a third polymeric layer having a first surface and a second surface, the first surface of the third polymeric layer positioned adjacent the second surface of the third polymeric layer, the third polymeric layer including polypropylene or polyvinyl chloride.

In one form, the step of forming the first polymeric layer includes extruding the first polymeric layer, the step of forming the second polymeric layer includes extruding the second polymeric layer, and the step of forming the third polymeric layer includes extruding the third polymeric layer.

In another form, the multi-layer film is coextruded.

In yet another form, prior to lamination, a first tie layer is disposed between the second surface of the first polymeric layer and the first surface of the second polymeric layer and a second tie layer is disposed between the second surface of the second polymeric layer and the first surface of the third polymeric layer.

In another aspect, provided is a thermoformed blister package formed from a multi-layer film structure, the multi-layer film structure including a first polymeric layer having a first surface and a second surface, the first polymeric layer including a metalized polyethylene teraphthalate, a second polymeric layer having a first surface and a second surface, the first surface of the second polymeric layer disposed adjacent the second surface of the first polymeric layer, the second polymeric layer including a cyclic olefin or a homopolymer of chlorotrifluoroethylene, and a third polymeric layer having a first surface and a second surface, the first surface of the third polymeric layer disposed adjacent the second surface of the second polymeric layer, the third polymeric layer including polypropylene or polyvinyl chloride, wherein the thermoformed blister package defines a plurality of domed receptacle portions.

In one form, the domed receptacle portions contain compressed tobacco products in the form of tablets.

These and other features will be apparent from the detailed description taken with reference to the accompanying drawings.

BRIEF DESCRIPTION OF THE DRAWINGS

Further explanation may be achieved by reference to the description that follows and the drawings illustrating, by way of non-limiting examples, various forms, wherein.

DETAILED DESCRIPTION

Various aspects will now be described with reference to specific forms selected for purposes of illustration. It will be appreciated that the spirit and scope of the packages and methods disclosed herein are not limited to the selected forms. Moreover, it is to be noted that the figures provided herein are not drawn to any particular proportion or scale, and that many variations can be made to the illustrated forms. Reference is now made to FIGS. 1-4, wherein like numerals are used to designate like elements throughout.

Definitions

The term "blister pack" is used herein to embrace a pre-formed or pre-configured packaging sheet or film, for example configured as a shallow tray, pre-profiled with multiple localized compartments or pockets. The individual compartment profile conveniently complements that of the intended contents, to ensure a snug relative fit. The pocket wall affords some resistance to impact, but is typically deformable to allow contents displacement and ejection, and modest cushioning action.

The terms "film" and "sheet" are used interchangeably throughout this disclosure, although sheet may also be used to refer to a film that is thicker than 100 microns. "Mils" refers to thousandths of an inch and may be used to refer to a film thickness.

The term "child-resistant" relates to certain measures to impede unauthorized pack opening or access to children, as might otherwise arise by casual or curious handling, as encountered in child play. Such provision represents a precautionary or deterrent measure, rather than necessarily an absolute defense/

The term "tablet" is used in its common context, and refers to a solid composition made by compressing and/or molding a mixture of compositions in a form convenient for buccal application.

Figure 1:
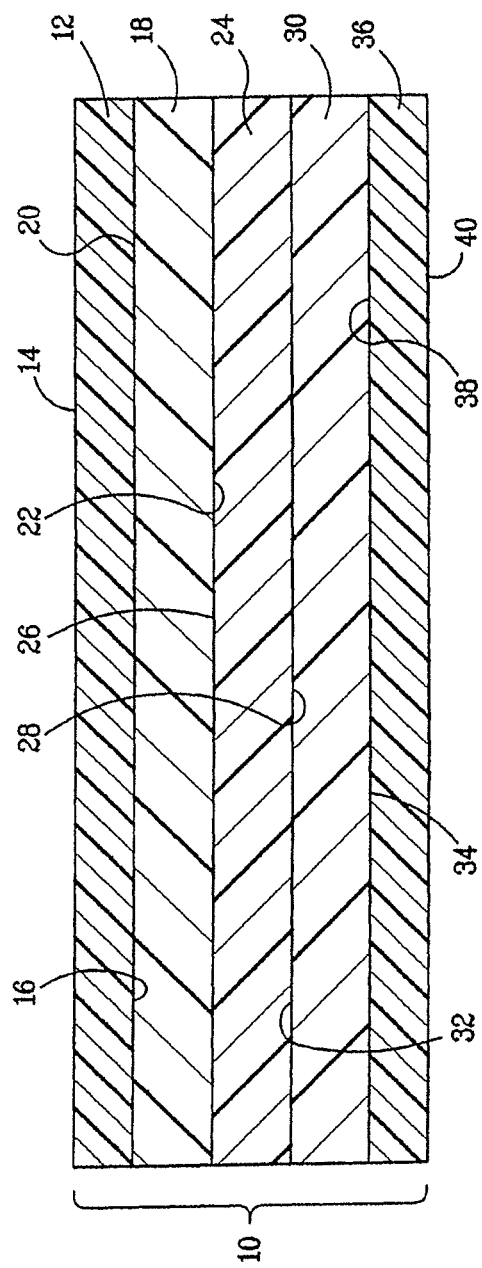
FIG. 1 is a schematic cross-sectional view of a multilayer film for use in forming the blister packs disclosed herein.

Referring to FIG. 1, one form of a multi-layer film structure 10 is shown. The multi-layer structure 10 includes a first polymeric layer 12 having a first surface 14 and a second surface 16. First polymeric layer 12 comprises a metalized polyethylene terephthalate. A first tie layer 18 is provided having a first surface 20 and a second surface 22, first surface 20 of the first tie layer 18 being disposed on second surface 16 of first polymeric layer 12. First tie layer 18 may comprise an adhesive lacquer, the adhesive lacquer serving as a tie layer, as those skilled in the art will recognize.

Multi-layer film structure 10 also includes a second polymeric layer 24 having a first surface 26 and a second surface 28, the first surface 26 of second polymeric layer 24 disposed on second surface 22 of first tie layer 18. Second polymeric layer 24 comprises a cyclic olefin or a homopolymer of chlorotrifluoroethylene. A second tie layer 30 is provided having a first surface 32 and a second surface 34. First surface 32 of second tie layer 30 is disposed on second surface 28 of second polymeric layer 24. As with first tie layer 18, second tie layer 30 may comprise an adhesive lacquer, which may serve as a tie layer. A third polymeric layer 36 is provided having a first surface 38 and a second surface 40, wherein second surface 40 of third polymeric layer 25 forms an outermost surface of film structure 10. As shown in FIG. 1, first surface 38 of third polymeric layer 36 is disposed on second surface 34 of second tie layer 30. Third polymeric layer 36 comprises polypropylene or polyvinyl chloride. The first surface of the first polymeric layer can also form an outermost surface of the film. The multi-layer film can have a density from 0.98 to 1.03 g/cm$^3$, a water vapor transmission rate of from 0.20 to 3.00 g/m$^2$/24 hrs, as determined by ASTM F-1249, and each of said three polymeric layers can have a thickness of from about 25 μm to about 205 μm.

In one form, first polymeric layer 12 may be a metalized layer of polyester, such as polyethylene terephthalate. The metalized polyethylene terephthalate may be an aluminum metalized polyethylene terephthalate film prepared by a vacuum metalizing process. Biaxially oriented metalized polyethylene terephthalate is available under the trademark Mylar®, which is produced by a joint venture of DuPont and Teijin Films. Advantageously, metalized polyethylene terephthalate is inert to water, serves as a moisture barrier and is unaffected by oils, greases and most aromatics. Metalized polyethylene terephthalate remains tough and flexible from −100° F. (−73.33° C.) to over 300° F. (148.88° C.).

The metalized layer may be formed on the first polymeric layer or applied on the first polymeric layer. The metalized layer may be formed on the first polymeric layer by one or more of the processes of metallization, including vacuum deposition, indirect metallization, electroless plating, electrolytic plating and lacquer painting. Typically, the metalized layer consists of at least one metal selected from a group of metals consisting of aluminum, copper, silver, gold, brass and bronze. Owing to its highly reflective properties, aluminum metalized polyethylene terephthalate provides a surface that is nearly mirror-like.

The metalized layer may be coated with a fine metallic deposition, typically, aluminum in the range of 0.005 to 2 microns. The metal deposition in such thin layers results in a metalized film with enhanced moisture barrier properties with a loss of transparency of the film resulting in a metalized semitransparent to opaque film.

In one form, first tie layer 18 may include an adhesive so as to serve as an adhesive tie layer. First tie layer 18 may be applied either directly onto either of the first polymeric layer 12 or second polymeric layer 24 by any appropriate means in the art, such as by coating. Any suitable adhesive, such as polyurethane, epoxy, polyester, acrylic, anhydride modified polyolefin and blends thereof, may be employed. One type of adhesive includes modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride and the like. Modified polyolefins suitable for use include compositions described in U.S. Pat. Nos. 3,481,910, 3,480,580, 4,612,155 and 4,751,270.

Other adhesive layers may include alkyl ester copolymers of olefins and alkyl esters of α,β-ethylenically unsaturated carboxylic acids such as those described in U.S. Pat. No. 5,139,878. The modified polyolefin composition may comprise from about 0.001 to about 20 weight percent of the functional moiety, based on the total weight of the modified polyolefin or from about 0.05 to about 10 weight percent, or from about 0.1 to about 5 weight percent. The modified polyolefin composition may also contain up to about 40 weight percent of thermoplastic elastomers and alkyl esters. In one form, first tie layer 18 may comprise an adhesive lacquer.

In one form, second polymeric layer 24 may comprise a cyclic olefin, such as a cyclo-olefin copolymer. Useful cyclo-olefin copolymers, collectively referred to herein as COC resins are known. For example, U.S. Pat. Nos. 5,912,070 and 6,068,936 disclose several cyclo-olefin copolymers, the disclosures of which are hereby incorporated by reference in their entirety. Suitable cyclo-olefin copolymers may also include copolymers of cyclo-olefin monomers and acyclic olefin monomers.

As is known to those skilled in the art, cyclo-olefins are mono- or polyunsaturated polycyclic ring systems, such as cycloalkenes, bicycloalkenes, tricycloalkenes or tetracycloalkenes. The ring systems can be mono-substituted or poly-substituted. In one form, the cyclic olefin may include at least one pendant organic group. The pendant organic group may include alcohols, amines, carbonyls, ethers, hydrocarbons, nitrites, sulfides, and combinations thereof. Examples of suitable cyclic olefins include, but are not limited to, norbornene, dimethyl-octahydronaphthalene, cyclopentene, (5-methyl)norbornene, and combinations thereof.

In one form, the monomers can be made into homopolymer COC or polymerized with acyclic comonomers, which may be referred to generally as a crosslinker or simply as a comonomer. Examples of suitable acyclic olefin monomers which may be polymerized with the cyclo-olefins noted above are ethylene, propylene, butylene and the like, or mixtures thereof. A preferred cyclic olefin is norbornene, and a preferred acyclic olefin for reaction therewith is ethylene. If the cyclic olefin copolymer includes norbornene, the norbornene may be included in an amount of from 10 to 70 mole percent or from 25 to 45 mole percent. If the cyclic olefin copolymer includes ethylene, the ethylene may be included in an amount of from 30 to 90 mole percent or from 55 to 75, mole percent.

Cyclo-olefin polymers can be prepared with the aid of transition-metal catalysts, e.g. metallocenes. Suitable preparation processes are known and described, for example, in U.S. Pat. Nos. 5,912,070; 6,008,298; 6,489,016; and 6,608,936, the disclosures of which are incorporated herein in their entirety by reference.

Suitable cyclo-olefin copolymers are commercially available, examples of which include Topas® 8007F04, manufactured by Ticona of Summit, N.J., Zeonex® from Zeon Chemicals of Louisville Ky., and Arton®, from JSR Corporation of Tokyo, Japan. Mitsui Petrochemical Industries of Tokyo, Japan also produces suitable cyclo-olefin copolymers.

In another form, second polymeric layer 24 may comprise a fluoropolymer. Suitable fluoropolymers include, but are not limited to, ethylene-chlorotrifluoroethylene (ECTFE), ethylene-tetrafluoroethylene copolymer, fluorinated ethylene-propylene copolymer, perfluoroalkoxyethylene, polychlorotrifluoroethylene (PCTFE) homopolymer or copolymer, polytetrafluoroethylene, polyvinylfluoride, polyvinylidene fluoride, and copolymers and blends thereof. In one form, the fluoropolymers include homopolymers and copolymers of PCTFE and copolymers of ECTFE. As used herein, copolymers include polymers having two or more monomer components. Such copolymers may contain up to 10%, and preferably up to 8% by weight of other comonomers, such as vinylidene fluoride and tetrafluoroethylene. Suitable fluoropolymers are commercially available, an example of which includes the PCTFE fluoropolymers available under the trademark Aclar® from Honeywell International Inc. of Morristown, N.J. In one form, the fluoropolymer is a homopolymer of chlorotrifluoroethylene.

In one form, second tie layer 30 may also include an adhesive so as to serve as an adhesive tie layer. Second tie layer 30 may also be applied either directly onto either of the second polymeric layer 24 or third polymeric layer 26 by any appropriate means in the art, such as by coating. Any suitable adhesive, such as polyurethane, epoxy, polyester, acrylic, anhydride modified polyolefin and blends thereof, may be employed. Modified polyolefin compositions having at least one functional moiety selected from the group consisting of unsaturated polycarboxylic acids and anhydrides may be employed. Such unsaturated carboxylic acid and anhydrides include maleic acid and anhydride, fumaric acid and anhydride, crotonic acid and anhydride, citraconic acid and anhydride, itaconic acid and anhydride and the like. Once again, suitable modified polyolefins include compositions described in U.S. Pat. Nos. 3,481,910; 3,480,580; 4,612,155; and 4,751,270.

As with first tie layer 18, other adhesive layers may include alkyl ester copolymers of olefins and alkyl esters of α,β-ethylenically unsaturated carboxylic acids such as those described in U.S. Pat. No. 5,139,878. The modified polyolefin composition may comprise from about 0.001 to about 20 weight percent of the functional moiety, based on the total weight of the modified polyolefin or from about 0.05 to about 10 weight percent, or from about 0.1 to about 5 weight percent. The modified polyolefin composition may also contain up to about 40 weight percent of thermoplastic elastomers and alkyl esters as described in U.S. Pat. No. 5,139,878. In one form, second tie layer 30 may comprise an adhesive lacquer.

Third polymeric layer 36 may comprise polyvinyl chloride (PVC), copolymers and terpolymers of vinyl chloride, such as a terpolymer of polyvinyl chloride/polyethlene/polypropylene, and mixtures thereof. As those skilled in the art widely recognize, PVC is commercially available from a wide variety of sources.

In an alternative form, a method to create a metallic outer surface having a premium appearance on a blister pack may include the use of materials like polypropylene/cyclic olefin copolymer/polypropylene or polyvinyl chloride/cyclic olefin copolymer/polyvinyl chloride is provided. The metallic layer may be created by depositing a coating on the blister material through vacuum metalizing. The coating can be applied to the blister material either before or after thermoforming of the blister receptacles. Before metalizing, a pre-coat or base coat may be applied over the blister pack to fill in surface irregularities and surface defects that may exist within the blister material. A topcoat may then be applied over the metalized layer to protect against scratches or abrasion. A bright metallic color can be produced, over the metalized layer, by adding color pigment to the top coat material.

Figure 2:
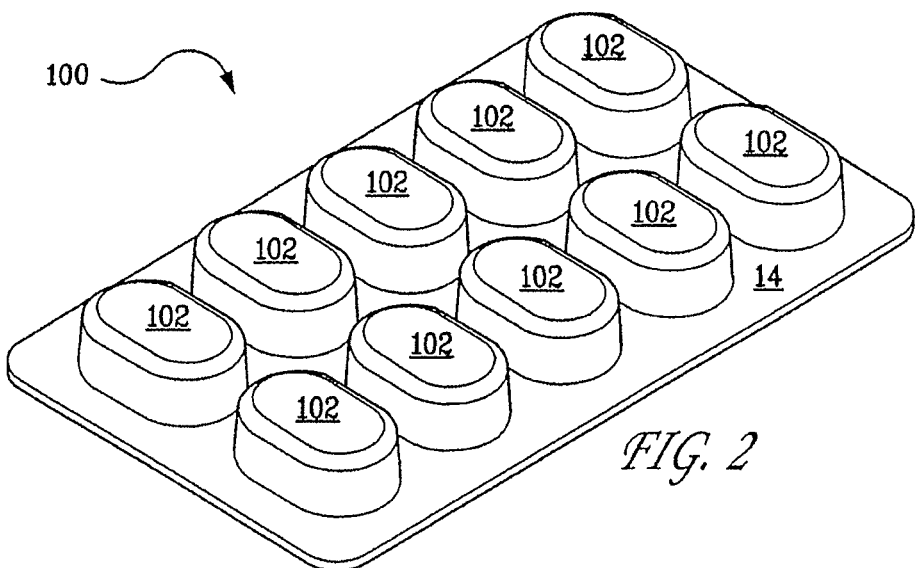
FIG. 2 is a perspective view of a blister pack, in accordance herewith.
Figure 3:
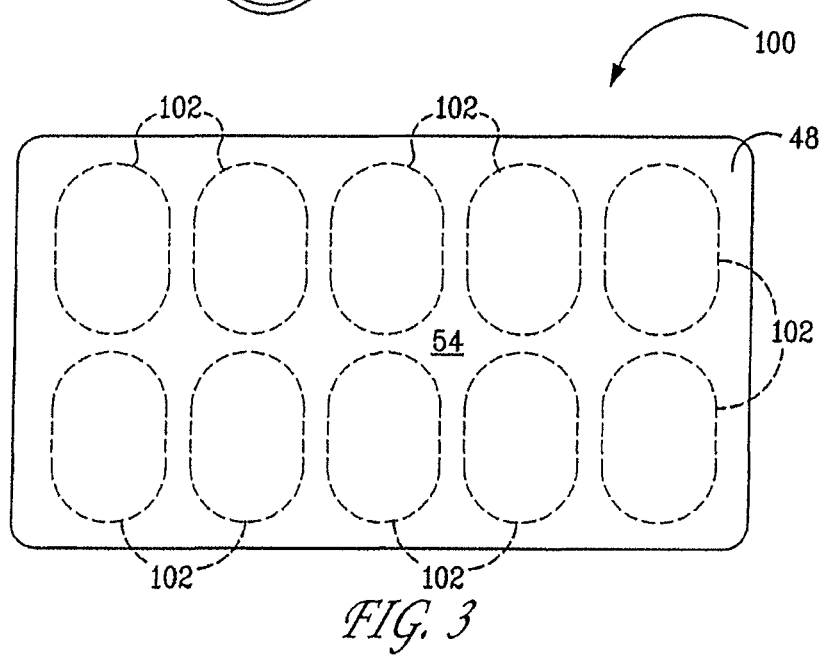
FIG. 3 is a bottom plan view of the blister pack of FIG. 2.
Figure 4:
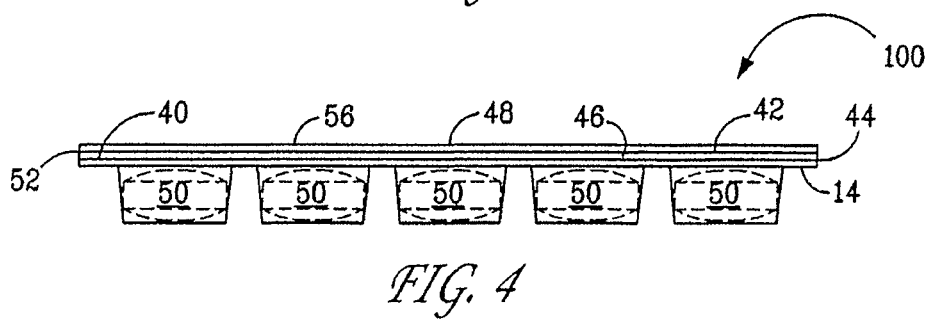
FIG. 4 is a side plan view of the blister pack of FIG. 2.

Referring now to FIGS. 2 through 4, in one form, the films disclosed herein are formed into a blister pack. The film structure may be thermoformed into a blister pack using techniques that are well known in the art.

As shown, blister pack 100 includes a plurality of receptacles 102. Referring to FIG. 4, each receptacle 102 may contain a tablet 50. In one form, the plurality of receptacles 102 of blister pack 100 is arranged in at least two columns.

Referring now to FIG. 3, as may be appreciated, the blister pack 100 disclosed herein may provide a surface area 54 for the printing of graphics and product information.

The film is molded such that the blister has an outer surface, an inner surface and a cavity. After thermoforming, a tablet 50, which may be a compressed tobacco product, or the like, is inserted into the cavity and the structure is heat sealed with a lid-stock film 42 by heat sealing the outer surface of the lid-stock film 42 directly to the third polymeric layer 36. In this form, the lid-stock film 42 may comprise a support layer 46 adhered to the third polymeric layer 36 via a third tie layer 44, and a metallic foil layer 48 adhered to the support layer 46 via a fourth tie layer 52. The support layer 46 may be comprised of a thermoplastic material, such as a material selected from the group consisting of polyolefins, polyamides, polyesters, polystyrene, poly(vinyl chloride), polyvinylidene chloride, polyurethanes and combinations thereof.

In another form, tablet 50, which may be a compressed tobacco product, or the like, is captured or restrained within receptacles 102, by a releasable, removable or frangible backing layer 56, typically produced from a metal, such as aluminum foil, metalized plastics foil, or a laminated paper and foil combination. In a laminated paper and foil combination, the paper 48 is adhesively bonded in a laminated, multi-ply, overlay to the foil 46, and used as a lift-off release layer. As such, the paper 48 is intended to protect the underlying foil 46 while the paper 48 is in place. To that end, the paper 48 is bonded to the foil 46, and is not otherwise secured to the blister pack 100 itself.

In this form, the foil 46 is fused, by heat welding, such as by a heated profiled platen, to the receptacle 102, except for certain localized areas, such as at the edges, which serve as a backing paper lift-off point for paper separation and removal from the foil 46. The paper overlay 48 effectively obscures the foil 46 and impedes piecemeal foil and receptacle separation.

Generally, the paper layer 48 constitutes a tamper-resistant and child-resistant layer to prevent casual blister pack content discharge, such as through inquisitive handling and experimentation. Once the paper overlay 48 is peeled back from the foil underlay 46, over a selected tablet receptacle 102 of the blister pack 100, foil puncture is allowed.

To assist localized peeling of the protective paper backing layer 48, it is known to apply a matrix or grid of perforations, say, upon pack fabrication and assembly. Thus local removal of a paper backing cover portion 48 overlying a particular receptacle 102 and local exposure of foil 46 overlying that pocket, allows content displacement and ultimate ejection, upon foil tearing or rupture, by depressing the relevant resiliently deformable blister receptacle wall.

As may be appreciated, machines dedicated to blister pack production that are capable of high speed operation are envisioned for use in the production of blister pack 100.

As indicated, blister pack 100 may advantageously be employed to package a plurality of dissolvable compressed tobacco products that are adapted to be consumed orally. Compressed tobacco products of this type are disclosed in U.S. Application Ser. No. 60/990,661, the contents of which are hereby incorporated for all that they disclose. Such compressed tobacco products are formed from a composition that includes at least one tobacco component, at least one flavorant, at least one sweetener, at least one filler-binder, at least one lubricant; at least one desiccant and a glidant. The outer surfaces of the compressed tobacco products packaged within blister pack 100 may optionally be coated, treated, embossed or debossed.

Advantageously, blister pack 100 is designed to be capable of high speed assembly, and may employ the attendant machines and processes associated therewith.

As may be appreciated, the blister packs disclosed herein can provide the following features: tamper prevention, surface area for graphics, and a premium finished appearance that provides a non-pharmaceutical look.

The design of the blister packs disclosed herein allows for multiple quantities to be packaged. The forms contemplated may include 8, 10, 16, and 20 count packages.

All patents, test procedures, and other documents cited herein, including priority documents, are fully incorporated by reference to the extent such disclosure is not inconsistent with this disclosure and for all jurisdictions in which such incorporation is permitted.

While the illustrative embodiments disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which the disclosure pertains.

What is claimed is:

1. A method of making a multi-layer film structure, the method comprising:
    forming a first polymeric layer having a first surface and a second surface, the first polymeric layer including a metalized polyethylene teraphthalate;
    forming a second polymeric layer having a first surface and a second surface, the first surface of the second polymeric layer positioned adjacent the second surface of the first polymeric layer, the second polymeric layer including a cyclic olefin;
    forming a third polymeric layer having a first surface and a second surface, the first surface of the third polymeric layer positioned adjacent the second surface of the third polymeric layer, the third polymeric layer including polypropylene or polyvinyl chloride;
    forming a lid-stock film arranged between a flat film and the multi-layer film structure, the lid-stock film configured to provide support;
    thermoforming the multi-layer film structure to define a plurality of domed receptacle portions; and
    covering a plurality of cavities defined by the plurality of domed receptacle portions with the flat film, a flat surface of the flat film extending over each of the plurality of cavities, and the flat film including a metallic foil.

2. The method of claim 1,
    wherein the step of forming the first polymeric layer comprises extruding the first polymeric layer to form the first polymeric layer,
    the step of forming the second polymeric layer comprises extruding the second polymeric layer to form the second polymeric layer, and
    the step of forming the third polymeric layer comprises extruding the third polymeric layer to form the third polymeric layer.

3. The method of claim 1, wherein the multi-layer film is coextruded.

4. The method of claim 1, wherein the forming the first polymeric layer, the forming the second polymeric layer, and the forming the third polymeric layer form the multi-layer film structure having a laminated construction.

5. The method of claim 1, further comprising:
    positioning a first tie layer between the second surface of the first polymeric layer and the first surface of the second polymeric layer; and
    positioning a second tie layer between the second surface of the second polymeric layer and the first surface of the third polymeric layer.

6. The method of claim 5, wherein the first tie layer and the second tie layer each include an adhesive lacquer.

7. The method of claim 1, wherein the cyclic olefin includes a cyclo-olefin copolymer.

8. The method of claim 7, wherein the cyclo-olefin copolymer is a copolymer of norbornene and ethylene.

9. The method of claim 1, further comprising: forming a metalized layer on the first polymeric layer.

10. The method of claim 9, further comprising:
    forming the metalized layer on the first polymeric layer by vacuum deposition, indirect metallization, electro-less plating, electrolytic plating, lacquer painting, or a sub-combination thereof, or a combination thereof.

11. A thermoformed blister package comprising:
    a multi-layer film structure, the multi-layer film structure including, a first polymeric layer having a first surface and a second surface, the first polymeric layer including, a metalized polyethylene terephthalate, a second polymeric layer having a first surface and a second surface, the first surface of the second polymeric layer adjacent the second surface of the first polymeric layer, the second polymeric layer including, a cyclic olefin or a homopolymer of chlorotrifluoroethylene, and a third polymeric layer having a first surface and a second surface, the first surface of the third polymeric layer adjacent the second surface of the second polymeric layer, the third polymeric layer including, polypropylene or polyvinyl chloride, wherein the multi-layer film structure is thermoformed to define a plurality of domed receptacle portions;

a flat film including a metallic foil, the flat film covering cavities defined by the plurality of domed receptacle portions, and a flat surface of the flat film extending over each of the cavities defined by the plurality of domed receptacle portions; and a lid-stock film arranged between the flat film and the multi-layer film structure, the lid-stock film configured to provide support.

12. The blister package of claim 11, wherein the domed receptacle portions contain compressed tobacco products in the form of tablets or the like.

13. The blister package of claim 11, in which a metalized layer is formed on the first polymeric layer.

14. The blister package of claim 11, in which a metalized layer is formed on the first polymeric layer by one of vacuum deposition, indirect metallization, electro-less plating, electrolytic plating, lacquer painting, or a sub-combination thereof, or a combination thereof.

15. The blister package of claim 11, in which the metal of the metalized polyethylene terephthalate layer includes one of aluminum, copper, silver, gold, brass, bronze, or a sub-combination thereof, or a combination thereof.

16. The blister package of claim 11, wherein the flat film is adjacent to a portion of the third polymeric layer.

17. The blister package of claim 11, wherein the multi-layer film structure further comprises:

a tie layer between the second surface of the first polymeric layer and the first surface of the second polymeric layer.

18. The blister package of claim 17, wherein the tie layer includes an adhesive lacquer.

19. The blister package of claim 11, wherein the multi-layer film structure further comprises:

a tie layer between the second surface of the second polymeric layer and the first surface of the third polymeric layer.

20. The blister package of claim 19, wherein the tie layer includes an adhesive lacquer.

21. The blister package of claim 11, wherein the metallic foil is frangible.

* * * * *